United States Patent [19]
Deitert

[11] Patent Number: 5,664,308
[45] Date of Patent: Sep. 9, 1997

[54] MACHINE TOOL HAVING A TOOL MOUNTED ECCENTRICALLY ON A ROTATABLE TURNTABLE

[76] Inventor: Heinz Deitert, Pixeler Strasse 36, 33442 Herzebrock, Germany

[21] Appl. No.: 562,026

[22] Filed: Nov. 22, 1995

[30] Foreign Application Priority Data

Nov. 25, 1994 [DE] Germany ............................ 9418723 U

[51] Int. Cl.$^6$ .............................. B23Q 1/25; B23C 1/12
[52] U.S. Cl. .................. 29/40; 408/35; 409/201; 409/211; 409/216
[58] Field of Search ...................... 29/39, 40, 36; 409/211, 203, 201, 204, 215, 216, 213; 408/35

[56] References Cited

U.S. PATENT DOCUMENTS

| | | | |
|---|---|---|---|
| 2,340,210 | 1/1944 | Armitage et al. ................. | 409/201 |
| 2,499,842 | 3/1950 | Armitage ........................... | 409/201 |
| 2,835,172 | 5/1958 | Barker et al. ..................... | 409/144 |

*Primary Examiner*—William R. Briggs
*Attorney, Agent, or Firm*—Burns, Doane, Swecker & Mathis, L.L.P.

[57] ABSTRACT

A machine tool includes a machine table for receiving a workpiece, a headstock disposed above the table, a turntable mounted on an underside of the headstock and being rotatable relative thereto about a vertical first axis, and a spindle mounted on the turntable for movement in a direction oriented radially relative to the first axis. The spindle includes a chuck for supporting a machining tool for rotation about a second axis oriented eccentrically relative to the first axis. The spindle is rotatable relative to the turntable about a third axis oriented orthogonally relative to the first axis. A second spindle can be mounted on the turntable for rotation about the first axis.

9 Claims, 3 Drawing Sheets

MACHINE TOOL HAVING A TOOL MOUNTED ECCENTRICALLY ON A ROTATABLE TURNTABLE

BACKGROUND OF THE INVENTION

The invention pertains to a machine tool comprised of a machine table, upon which a work piece can be fixed, and a moveable headstock installed opposite the work table having at least one driven spindle directed toward the work piece, which contains a machining tool.

Generally, work pieces are fixed onto a machine table for machining work and are brought to the desired shape through material removal by a rotating tool, which is held and driven by a spindle. This spindle is mounted in a moveable headstock arranged opposite the machine table, which also contains the spindle drive and any existing cooling medium feed. The headstock or the spindle itself can be moved toward and away from the machine table, in order to be able to establish the machining depth. Roughing tools are initially installed for the machining, in order to create the rough form, while the fine machining is accomplished subsequently by replacing the roughing tools with finishing tools. It is desirable, therefore, that the tool be able to reach all sections of the work piece, which is not readily possible with known machine tool constructions. For instance, the traversable reach is predefined by the distance which the machine table can be shifted, which does not suffice in all cases.

From this stems the objective defining the basis of this invention, according to which a machine tool of the conventional type is to be improved, such that the traversable reach is expanded without changing the machine table, and that roughing and smoothing is to be made possible with a single machine tool. Also, the machine tool is to be simply and economically manufactured and safely installed.

SUMMARY OF THE INVENTION

The invention involves a machine tool wherein a table is provided on which a workpiece is to be fixed. A movable headstock is arranged across from the table. The side of the headstock facing the work piece contains a turntable rotatable about an axis directed toward the table and work piece, and which is provided with a spindle spaced laterally from the turning axis of the turntable. With this arrangement the area which can be traversed by the spindle is enlarged, encompassing the radius of the eccentric spindle arrangement since the machine table can be displaced in at least one direction, as a rule in two directions perpendicular to one another. When the turntable is turned, the spindle (with the tool installed on it) is moved in a circular path whose radius corresponds to the eccentric position of the spindle so that besides the displacement of the machine table, the turning of the spindle determines the location of the machining. Thus, all positions of the work piece can be reached within the total working range. It is advantageous that the spindle be constructed as a high speed operating spindle, which is suited for smoothing. The tools inserted into it are, as a rule, those with slim shafts, so that a deep cutting into complex forms is also possible.

In an advantageous arrangement, the spindle is radially displaceable relative to the turntable, and/or the spindle can be tilted about an axis extending orthogonally relative to the turning axis of the turntable. Thus, the spindle is tiltable in a beneficial way such that the tool is tilted within a plane containing a radius of the turntable. The radial displacement, as well as the tilting, enlarges the useful operating range for machining, whereby the tilting makes possible a machining by back tapering. If both possibilities are employed together, a multitude of possibilities of use result which were previously confined to rigid-spindle arrangements.

In another preferred embodiment of the machine tool, a second spindle is provided along the turning center of the turntable, whose turning axis is directed toward the work piece. This central spindle, which is beneficial to construct as a low-speed operating spindle, allows a general coarse machining by roughening. The fine machining to follow is taken over by the first (eccentric) spindle, which is provided as a high-speed spindle with corresponding smoothing tools.

It is preferable to install precision drive units (for example, drive units with Hirth-toothing and brakes for resisting the associated forces) for the operation of the machine tool, which permit an exact positioning. Gear-reduced motors are used which have either a self-locking countershaft gear, or which operate a self-locking tilting drive. By this self-locking, it is guaranteed that the previous position is maintained.

It is further advantageous if stepper motors or AC motors are provided as the drives for the radial displacement and/or the tilting of the eccentric spindle. With these motors, well known CNC controls can be implemented which make possible a precise machining of the work piece without having to re-chuck in another machine tool as well as the ability to perform the coarse as well as the fine machining.

BRIEF DESCRIPTION OF THE DRAWING

The objects and advantages of the invention will become apparent from the following detailed description of preferred embodiments thereof in connection with the accompanying drawings in which the numerals designate like elements and in which.

DETAILED DESCRIPTION OF PREFERRED EMBODIMENTS OF THE INVENTION

Figure 1:
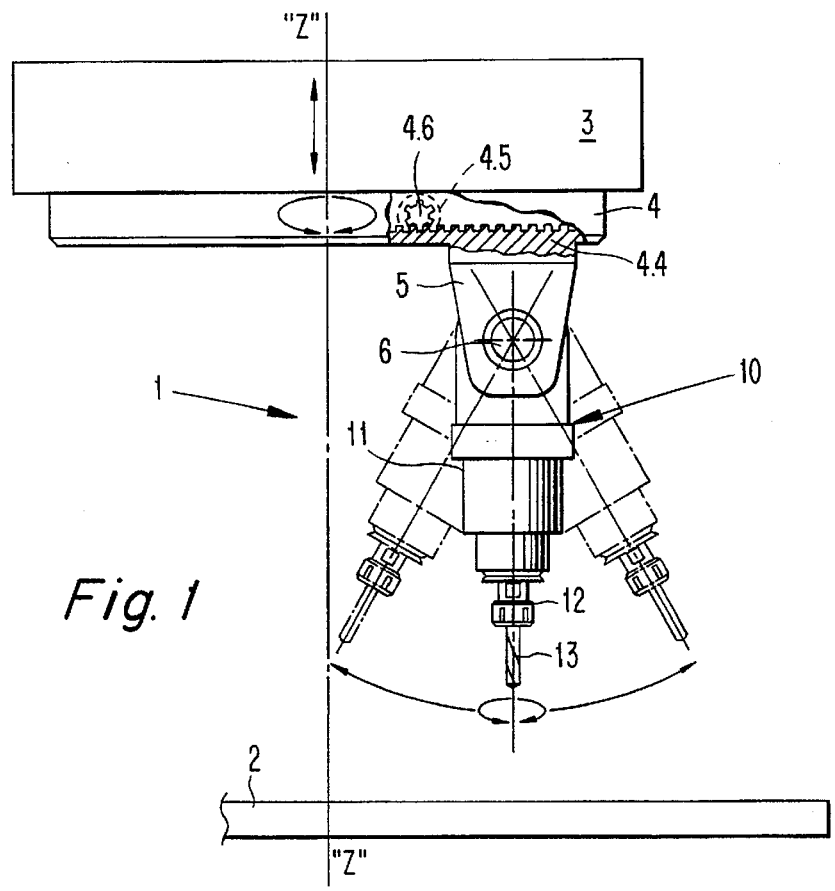
FIG. 1 is a schematic side view of a machine tool according to the invention.
Figure 2:
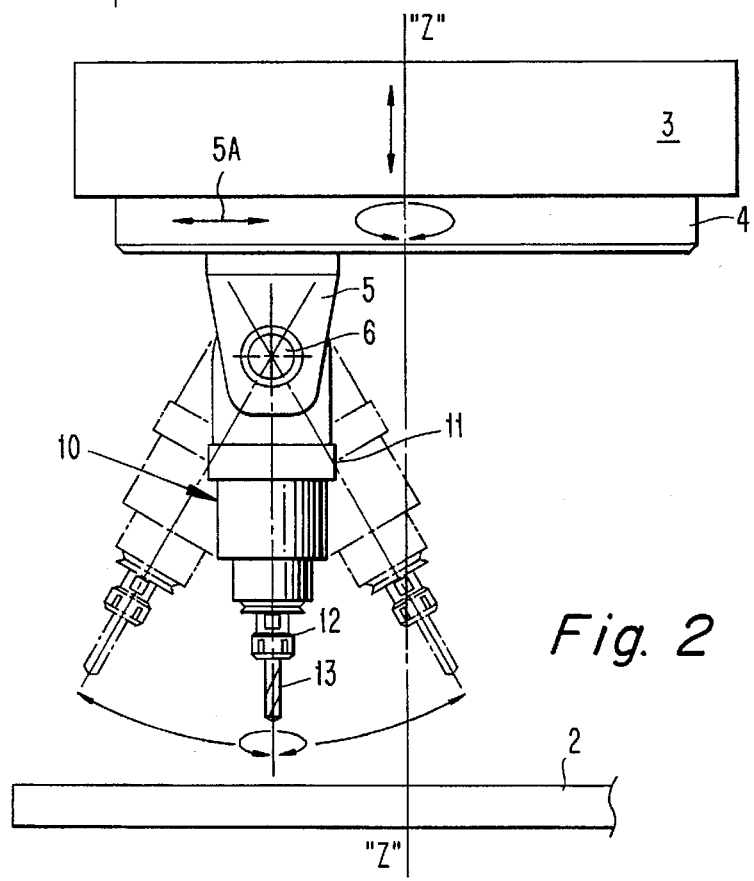
FIG. 2 is side view of the machine tool according to FIG. 1, after the turntable has been turned 150°.

The machine tool 1 represented in FIGS. 1 and 2 has a machine table 2 (schematically represented), on which the work piece to be machined (not described in more detail) is fixed with the help of conventional clamps. The machine table 2 is movable vertically and in a horizontal plane in a conventional manner. A spindle 10 is provided for free-cut machining of the work piece, which spindle 10 is disposed beneath a movable headstock 3. The spindle is installed on a turntable 4 that is mounted to the underside of the headstock 3 for rotation relative thereto about a vertical turning axis "Z". A chuck 12 of the spindle 3 clamps a machining tool, displayed here as a shaping drill 13, which is set into rotation by a motor mounted in the spindle 10. The spindle includes a housing 11 which holds the spindle head a desired distance from the lower side of the turntable 4. A fork-shaped bearing 5 holds the spindle housing 11, which housing can be turned about an axis H defined by a pair of aligned support shafts 6 such that the tip of the machining tool travels in a plane oriented in a radial direction relative to the turning axis Z of the turntable 4. Also, the fork bearing 5 is slidable linearly relative to the turntable 4 along a radius of the turntable, as indicated by the double-headed arrow 5A in FIG. 2. Alternatively, or in addition, the headstock could be displaceable in the direction of arrow 5A.

Figure 4:
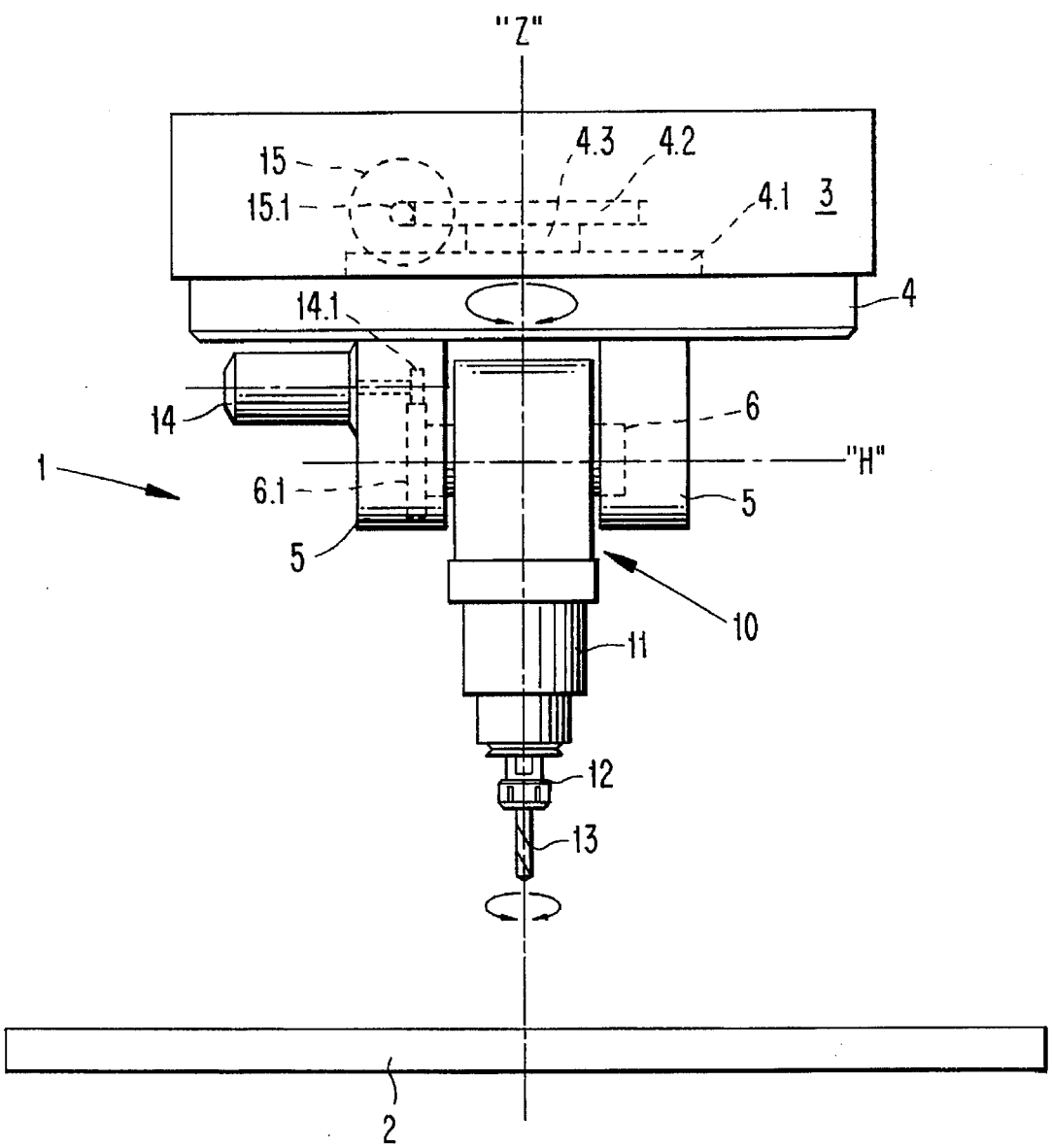
FIG. 4 is a view of the embodiment depicted in FIG. 1 when viewed in a direction oriented ninety degrees relative to that of FIG. 1.

FIG. 4 shows (schematically) a view of the machine tool 1, where the spindle 10, as compared to the representation in FIG. 1 is turned 90°. The machine tool is mounted on a machine column (not shown) along which it can vertically travel. The tool 13 is driven by the motor located in the spindle housing 11 at high or low speed. In order to be able to turn the turntable 4 about the "Z" axis, the turntable 4 is equipped with a drive located in the headstock 3, which drive includes a worm gear 4.2 (not illustrated in detail). A screw spindle 15.1 engages this worm gear and is drive by a servomotor 15. The worm gear 4.2 is connected to the turntable 4 by a shaft 4.3 passing through a bearing plate 4.1. The worm drive is self-locking and permits an exact positioning of the turntable 4.

For tilting of spindle 10 about the horizontal axis "H", a drive is provided on the fork bearing 5 in the form of a drive motor 14 whose output drives one of the support shafts 6 by means of a motor-driven gear 14.1 and a driven gear 6.1. The motor 14 is constructed such that the output is self-locking.

It is understood that these drives represented here are merely examples for possible drives. Thus, alternatively, for example, a worm drive can be placed about the axis "H"for the tilt drive of the spindle, or stepper motors can be installed which affect the moving components directly. Movements can also be accomplished by hand whereby the component moved is fixed afterwards by a releasable fastener.

To displace the turntable radially with respect to the axis Z, a suitable drive can be provided in the turntable. For example, the bearings 5 can be slidable along a radial track formed in an underside of the turntable 4, and can be connected to a rack 4.4 that is displaced by a gear 4.6 driven by a motor 4.5. Alternately, there could be employed a motor-driven threaded spindle which drives a threaded bushing connected to the fork bearing.

If the turntable 4 is rotated about the central axis Z, the spindle 10 travels with it within an angle of 180° (compare FIGS. 1 and 2). If the fork bearing 5 also traverses along a radius of the turntable 4, for example, according to the double-headed arrow in FIG. 2, the tool 13 can reach a multitude of coordinates, which cannot be reached with a tool fixedly mounted on the axis "Z". Individual movement possibilities are represented by various double arrows.

Figure 3:
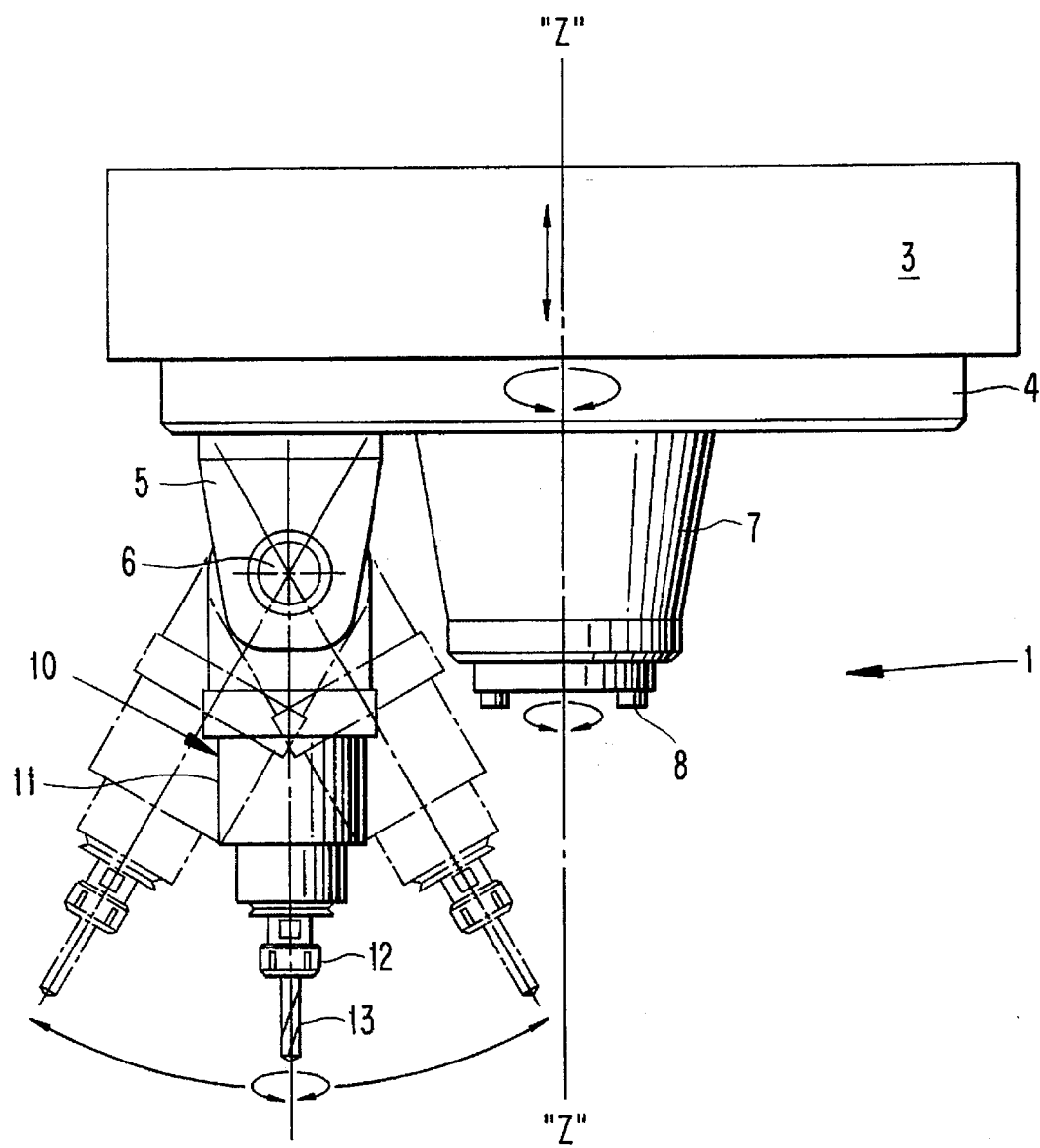
FIG. 3 is a schematic side view of a second embodiment of the machine tool with a central spindle added.

FIG. 3 shows an advantageous further embodiment wherein there can be provided a conventional central spindle 7 fixedly mounted on the axis "Z" and whose spindle head 8 can likewise be provided with a machining tool (not shown). In this embodiment the machine tool 1 can be employed with the machining tool provided in the spindle 10 or in central spindle 7, whereby the individual movement possibilities are identified by double headed arrows.

With the construction according to the present invention, the positioning possibilities of the machine tool are considerably expanded. At least two more degrees of freedom are added to the three degrees of freedom which a tooling machine normally has (lateral movement in both coordinates, generally performed from the machine table, height movement performed either by the tool part located on the machine column or by the machine table). The eccentrically arranged spindle can be shifted radially across the machine axis. The eccentrically arranged spindle can be radially shifted across the "Z" axis. The tool chucked in the spindle of the machine tool can be tilted such that the axis of the spindle with the tool can sit at an angle of up to preferably ±90° to the "Z" axis so that in the extreme case horizontal machining is also possible. A tool element with a drive unit case, a turntable and a spindle can possibly be retro-fitted to an existing machine tool, depending on the structure of the machine column.

With this construction, having an eccentrically arranged spindle, the working range of a machine tool is expanded without enlarging the working range of the machine table. This is particularly meaningful if a central spindle is provided.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A machine tool comprising:
   a machine table for receiving a workpiece;
   a headstock disposed across from the table and including a side facing the table;
   a turntable mounted on the side of the headstock and rotatable relative to the headstock about a first axis passing through the table;
   a first spindle mounted on the turntable and including a chuck for carrying a motor-driven machining tool for rotation about a second axis disposed eccentrically relative to the first axis; and
   a second spindle mounted to the turntable and including a chuck for carrying a machining tool for rotation about the first axis.

2. The machine tool according to claim 1, wherein the first spindle is movable relative to the headstock in a direction oriented radially with respect to the first axis.

3. The machine according to claim 1, wherein the first spindle is movable relative to the turntable in a direction oriented radially with respect to the first axis.

4. The machine according to claim 3, wherein the first spindle is rotatable relative to the turntable about a third axis oriented orthogonally relative to the first axis.

5. The machine according to claim 2, wherein the first spindle is rotatable relative to the turntable about a third axis oriented orthogonally relative to the first axis.

6. The machine according to claim 1, wherein the first spindle is rotatable relative to the turntable about a third axis oriented orthogonally relative to the first axis.

7. The machine according to claim 6, wherein the rotation of the first spindle about the third axis causes the first spindle to rotate within a plane oriented radially with respect to the first axis.

8. The machine tool according to claim 1, wherein the first spindle comprises a high-speed spindle.

9. The machine tool according to claim 1, wherein the second spindle comprises a low-speed spindle.

* * * * *